United States Patent
Hu

[19]

[11] Patent Number: 6,152,158
[45] Date of Patent: Nov. 28, 2000

[54] GASEOUS WAVE PRESSURE REGULATOR AND ITS ENERGY RECOVERY SYSTEM

[76] Inventor: Zhimin Hu, 101 Natick Ave., Cranston, R.I. 02921

[21] Appl. No.: 09/277,535

[22] Filed: Mar. 26, 1999

[51] Int. Cl.⁷ ..................................... F16L 55/18
[52] U.S. Cl. ...................... 137/14; 137/340; 137/625.33; 137/561 A; 251/127
[58] Field of Search ................................... 251/127, 122, 251/118; 137/625.33, 601.19, 561 A, 340, 14

[56] References Cited

U.S. PATENT DOCUMENTS

| | | | |
|---|---|---|---|
| D. 318,318 | 7/1991 | Datta | D23/235 |
| 1,645,601 | 10/1927 | Lee | 251/127 |
| 3,580,271 | 5/1971 | Farrer | 137/458 |
| 3,623,506 | 11/1971 | Bonner | 137/613 |
| 3,648,727 | 3/1972 | Huyck | 137/505 |
| 3,665,956 | 5/1972 | Hammon | 137/505.11 |
| 3,675,678 | 7/1972 | Lamping | 137/505.22 |
| 3,698,425 | 10/1972 | Fisher | 137/505.25 |
| 3,773,071 | 11/1973 | Stang, Jr. | 137/484.8 |
| 3,841,303 | 10/1974 | Martin | 126/343.5 A |
| 3,845,780 | 11/1974 | Cardas | 137/251 |
| 3,971,410 | 7/1976 | St. Clair | 137/613 |
| 3,989,060 | 11/1976 | Hughes | 137/329.4 |
| 4,067,354 | 1/1978 | St. Clair | 137/484.2 |
| 4,067,355 | 1/1978 | St. Clair | 137/458 |
| 4,111,222 | 9/1978 | Hassell | 137/69 |
| 4,150,693 | 4/1979 | Genevey et al. | 137/625.3 |
| 4,316,478 | 2/1982 | Gongwer | 137/625.33 |
| 4,332,549 | 6/1982 | Fuller | 431/344 |
| 4,503,883 | 3/1985 | Meacham, Jr. | 137/458 |
| 4,512,368 | 4/1985 | Kaminaka et al. | 137/561 A |
| 4,546,752 | 10/1985 | Blaser | 123/568 |
| 4,606,371 | 8/1986 | Maekawa | 137/270 |
| 4,679,582 | 7/1987 | Zwicker | 137/71 |
| 4,684,080 | 8/1987 | Pinson | 244/3.22 |
| 4,757,839 | 7/1988 | Marchal | 137/490 |
| 4,811,755 | 3/1989 | Bourdon | 137/486 |
| 4,817,664 | 4/1989 | Chang | 137/458 |
| 4,840,195 | 6/1989 | Zabrenski | 137/312 |
| 4,874,011 | 10/1989 | Canzano | 137/505.13 |
| 4,966,183 | 10/1990 | Williamson, Jr. | 137/116.5 |
| 4,971,108 | 11/1990 | Gottlieb | 137/495 |
| 4,974,629 | 12/1990 | Chang | 137/460 |
| 4,974,630 | 12/1990 | Chang | 137/460 |
| 5,047,965 | 9/1991 | Zlokovitz | 364/558 |
| 5,131,425 | 7/1992 | Sturgis | 137/116.5 |
| 5,156,642 | 10/1992 | Lopez | 137/15 |
| 5,392,825 | 2/1995 | Mims | 137/614.2 |
| 5,402,820 | 4/1995 | Duffy | 137/505.36 |
| 5,458,001 | 10/1995 | Ollivier | 73/715 |
| 5,507,308 | 4/1996 | Chambonnet | 137/81.2 |

(List continued on next page.)

FOREIGN PATENT DOCUMENTS

| 44887 | 10/1908 | Germany | 137/625.33 |

*Primary Examiner*—A. Michael Chambers

[57] ABSTRACT

This invention provides a gas wave pressure regulation method and apparatus, gaseous wave pressure regulator (GWPR), associated with a pressure energy recovery system which can be used in the processes of petrochemical and liquid natural gas (LNG) industries to recover the lost energy in a regulating process where a pressure regulation is needed to reduce the pressure level fitting the operating conditions, but the spontaneous temperature is undesirable. The said method and apparatus employ a mechanism creating a unsteady periodic flow by means of gaseous wave resonant interactions to convert the energy between the pressure drop into the form of heat without using any moving parts. The said heat is reused inside the GWPR to eliminate or diminish the temperature drop associated with the pressure regulation. The said pressure energy recovery system comprises a primary GWPR followed by a primary heat exchanger, and a secondary GWPR linked by a secondary heat exchanger operated in series. The GWPR in the present invention consists of a flow rate controlling unit, a flow induction unit, and a pressure energy converting unit. The operation of the GWPR is based on gaseous wave interactions between shock wave in high speed jets and longitudinal oscillation of gas column in resonant tubes by which the pulsating flow production can recover the pressure energy lost in the regulating process.

12 Claims, 4 Drawing Sheets

U.S. PATENT DOCUMENTS

| | | | |
|---|---|---|---|
| 5,531,242 | 7/1996 | Paganessi | 137/255 |
| 5,657,787 | 8/1997 | Diehl | 137/116.5 |
| 5,697,398 | 12/1997 | Gidney | 137/484.8 |
| 5,740,833 | 4/1998 | Olds | 137/505.12 |
| 5,787,925 | 8/1998 | Ollivier | 138/489.5 |
| 5,797,425 | 8/1998 | Carter | 137/505.46 |
| 5,810,029 | 9/1998 | Speros | 137/377 |

GASEOUS WAVE PRESSURE REGULATOR AND ITS ENERGY RECOVERY SYSTEM

BACKGROUND OF THE INVENTION

This invention involves a method by which the pressure-drop energy from a pressurized gas stream in a pressure regulation process can be recovered and reused so as to reduce and eliminate a temperature drop occurred spontaneously at the downstream of the pressurized gas, an apparatus by which the said process can be finished through a creation of a gaseous wave system to recover the pressure-drop energy and convert it into the form of heat being returned into the pressurized gas stream during the said pressure regulation process, and a pressure recovery system which is designed for a high pressure drop process to recover the pressure drop energy in the form of heat through heat exchanger units so as to return the heat into working stream being regulated or to be used for the other process. The mechanism in the present invention allows the pressure-drop energy, usually wasted in traditional pressure regulating processes, to be used in the form of heat, which can either be returned into the pressurized stream against the temperature drop or extracted from the gas stream. The application of the present invention is intended for a pressure energy recovery system in natural gas liquefaction plants, natural gas distributing regulation stations, and relative petrochemical industrial processes where the pressure regulation process is needed in order to meet the requirement of operating pressure conditions but where a temperature drop caused by the pressure regulation processes is unacceptable. In contrast with all prior arts used in pressure regulation processes, so called pressure regulators, the present invention has a unique feature in that the pressure-drop energy in conventional pressure regulators is used to produce a periodic gas resonant flow and wave interactions inside the device of the present invention, so that a heat effect is generated and reused in flow fluctuation conditions (either pressure drop or flow rate). This device is thus called a gaseous wave pressure regulator (GWPR) due to its operating features. By entirely operating under the unique mechanism, GWPR can recover the pressure energy loss in traditional pressure regulators which are now widely used in a variety of industries, and replace them to reduce energy loss and increase the efficiency of system operations in natural gas and petrochemical industries.

Potential applications of the present invention can be found in a wide range of industrial fields where pressure regulation processes are required. For instance, in petrochemical industries, numerous pressurized gas regulating processes are involved in processing operations such as condensation, separation, liquefaction, the delivering and redistributing of pressurized gas streams, vaporization and combustion of liquid gas, gas stream refining and distilling, etc.

No matter what pressure regulating processes are involved, generally speaking, all are operated under specific pressure conditions in order to meet two fundamental goals, i.e., 1) the optimization of the system performance and 2) maximization of production. Pressure regulation processes are defined here as the common measure to adjust the operated system in different pressure stages and to keep system operations in the proper condition. From the point of view of thermodynamics, all the pressure regulating processes are for two main purposes: (1) to obtain a cooling effect which is generated by the temperature drop from the pressure drop, and (2) to adjust the pressure level which fits the proper pressure operating condition for the optimized performance of the systems. The former is achieved by using either the pressure energy extracting devices such as gas expanders, or Joule-Thomson effect, such as throttling valves etc., between the pressure drop. The latter is completed only by using pressure regulation valves, so called pressure regulators, to regain the energy loss in such processes.

However, the pressure regulating devices used currently are all limited by some fundamental imperfections in their operation mechanism. The main difficulty in avoiding the loss of the pressure energy within devices, is to recover or extract the pressure-drop energy from pressure regulating processes which normally involves the structure with mechanical moving parts and reduces the reliability of system operations. As a result, in the normal industrial practice, this part of pressure energy is simply wasted, dissipated by flow friction and turbulence, because the current pressure regulating devices cannot recover the energy and maintain the simplicity and reliability of the operating system at the same time.

More specifically, in the pressure regulating processes, pressurized gas streams undergo in essence a steady Joule-Thomson process (J-T effect) to reduce the pressure level without heat and work transfer. The portion of energy in pressure drop is entirely dissipated during stream flows through pressure regulators. As a result, pressure regulation processes will bring about the energy loss between the pressure drop and the temperature change. This is due to the internal energy reduction and entropy increment which depends on the operating condition. The temperature effect along with the pressure drop is generally represented by the Joule-Thomson coefficient $\mu_{JT}$ defined by $$\mu_{JT} = \left(\frac{\partial T}{\partial P}\right)_h$$

which indicates the change in temperature due to a change in pressure at constant enthalpy. For a temperature increase during the pressure regulation, the Joule-Thomson coefficient is negative; for a temperature decrease, the Joule-Thomson coefficient is positive. Most of the pressurized gases used in the industrial system are imperfect gases with a higher inverse temperature above atmosphere, except for hydrogen and helium gases. Therefore, it is very common that a temperature drop accompanied with the pressure regulation process downstream of the pressurized gas can be observed in most industrial systems.

Unfortunately, all the current pressure regulating devices can not work without the generation of this spontaneous temperature drop although it is unexpected in the pressure regulation processes and not allowed by the certain process operations. The consequence of the temperature drop in some industrial processes can be very serious. It may lead to reduce production and system liability or lower system efficiency.

Usually, in order to overcome this inefficiency, additional processes and equipment are required to eliminate this temperature drop to reduce overall potential damage in the operation and the maintenance cost of systems. On the other hand, the cost will be added up due to the operation and maintenance of the additional processes and equipment. For instance, in the natural gas industry supplying natural gases from gas fields are delivered by the pipeline under a pressure level higher than the operating condition of an LNG operating plant and commercial residential area in the consideration of economical transportation. Before the supplying gas steam enters the utility network or LNG plants, a pressure regulation is required to reduce the stream pressure. A typical process diagram between a gas supply pipe and an LNG operating plant is shown in FIG. 4A.

As shown in FIG. 4A, before entering an LNG plant, a supply of natural gas has to pass through several pressure regulators to reduce the pressure level. This is necessary in fitting the pressure operating condition either to the LNG plant to be liquefied or to the residential distribution system. In both cases, the range of pressure drop passing the pressure regulator is around $\Delta P \approx 300 \sim 700$ psi, which is a significant pressure energy loss. On the other hand, since the pressurized gas stream reduces its temperature after the regulation, it results in two undesirable consequences to affect the LNG or gas distribution operation. Firstly, for the stream entering the LNG plant, some components of light hydrocarbon and water contained in supplying the pressurized gas stream will become partially vaporized which is in a liquid state and results in the overloading of the dehydrated unit and molecular seize absorbers. Malfunction in the operation of dehydrated devices such as molecular seize and absorbers in the early stage of the LNG plant, will reduce the LNG production and affect the reliability of the system's operation. Secondly, for the stream distributed into the residential system, the pressure drop between the distribution stations and the supplying pressurized stream is so great that it will result in the partial condensation of light hydrocarbon components as well.

In consequence of a temperature drop after pressure regulations, condensed light hydrocarbon components in the distribution pipeline will reduce the heat capacity or caloric value of natural gas, and the temperature drop also leads to the regulator being rusty in the summer and fully iced in the winter season, since the vapors in the atmosphere are condensed and accumulated on the regulators. In order to overcome the problem resulting in the temperature drop within the necessary pressure regulating processes, usually, in LNG industrial practices, additional heating devices, such as oil burners or electric heaters, are used to reheat the supplying pressurized gas stream before or after it passed through the pressure regulator. It is clear from this example that since the flowing volume heated is so great and the fuel or electricity cost to operate the reheating process is so huge, the amount of pressure energy loss is extremely significant.

Similar processes with double cost in both pressure energy waste and additional reheating bills attached to pressure regulations can also be found in other industrial processes and systems, where pressurized gas is delivered as fuel in a high pressure level and used in a lower pressure level—in all these cases, energy is lost and expenses increases.

Unfortunately, since pressure regulation methods and devices are so widely used in a variety of industrial processes, during the last few decades, a great deal of effort has been concentrated on the device performance based on the development of new technology without addressing the problem of energy loss and the negative consequence of temperature drop in the pressure regulator. In all previous arts, the progress and improvements have been focused on the mechanism design and controllability of pressure regulators to fit in with the specific operation condition and processes, as were employed by U.S. Pat. Nos. (5,810,029, 5,797,425, 5,787,925, 5,740,833, 5,697,398, 5,657,787, 5,507,308, 5,458,001, 5,402,820, 5,392,825, 5,131,425, 5,047,965, 4,974,630, 4,974,629, 4,971,108, 4,966,183, 4,874,011, 4,840,195, 4,817,664, 4,811,755, 4,757,839, 4,684,080, 4,679,582, 4,606,371, 4,546,752, 4,503,883, 4,332,549, 4,111,222, 4,067,355, 4,067,354, 3,989,060, 3,971,410, 3,845,780, 3,841,303, 3,773,071, 3,698,425, 3,675,678, 3,665,956, 3,648,727, 3,623,506, 3,580,271).

Before discussing the issue of energy loss in the traditional pressure regulators, a brief summary in the previous arts seems necessary so that the significance of the present invention can be viewed more clearly.

In U.S. Pat. No. 5,810,029, an anti-icing design is provided for a gas pressure regulator to prevent normal pressure regulator device from icing used as outside gas pressure regulator, which has a pressure vent and a downwardly opening vent tube associated with a skirt connected to and surrounding the vent tube. In this art, the mechanism design prevents rain or freezing rain from splashing back upwardly into the passage. In U.S. Pat. No. 5,797,425, a three-stage gas pressure regulator is provided in which a supplementary pressure regulator is used with conventional single or multi-stage pressure regulators with a novel two stage balanced pressure regulator to form a three-stage vacuum demand pressure regulation system in order to regulate the pressure of compressed gases used as fuel in engines, such as natural gas used in natural gas powered vehicles, especially useful in mono-, bi-, and dual fuel engine applications.

In U.S. Pat. No. 5,787,925, a pneumatically served gas pressure regulator is accomplished providing a relatively wide range of gas flow rates with precision outlet pressure control with a dome loaded gas pressure regulator and a pressure sensor controller integrated in a single unit. In U.S. Pat. No. 5,740,833, a two stage gas pressure regulator with a body housing having a gas inlet and a gas outlet, and a common interior wall dividing the body housing into two chambers forming two pressure reducing stages is given to accomplish the multi-stage regulation of pressurized gas stream. In U.S. Pat. No. 5,697,398, a method of manufacturing a diaphragm assembly for a fluid pressure regulator is introduced, including a disk for regulating the flow of fluid through an orifice and a valve stem attached to the disk. In U.S. Pat. No. 5,657,787, a gas pressure regulator is designed consisting of a body member which mounts a valve between the inlet and outlet gas passages, and also a tubular sleeve which communicates with the outlet passage. In U.S. Pat. No. 5,507,308, a gas pressure regulator is introduced with a piston, a hollow rod, a high pressure chamber, an internal chamber, and coacting with a valve seat. This invented regulator is useful in respiratory equipment for divers, particularly for divers in cold water.

U.S. Pat. No. 5,458,001 shows a gas pressure regulator and a diaphragm assembly which enables the precise alignment of a diaphragm and a valve carried thereby with respect to a valve seat for improved regulator performance. U.S. Pat. No. 5,402,820 shows a stabilizer for fluid pressure regulators enhancing regulator stability without affecting the regulator capacity. U.S. Pat. No. 5,392,825 uses a gas pressure regulator for regulating the output pressure of a gas from a pressurized gas cylinder, including a flashback assembly disposed at the gas outlet of the pressure regulator to reduce the possibility of migration of a flashback upstream from the torch and hose into the pressure regulator. U.S. Pat. No. 5,131,425 represents an improvement in a gas pressure regulator. It has an inlet, an outlet, a gas flow passage, and a regulator mechanism in the valve body, including a relief valve which is set to open when the pressure of the gas in the flow passage exceeds a predetermined pressure.

In U.S. Pat. No. 5,047,965, a microprocessor controlled gas pressure regulator provides an adjustment of a gas regulator valve, having a spring based diaphragm controlled pilot valve which is automatically affected by supplying augmenting pressure to the spring side of the diaphragm via an electrically adjustable regulator valve under the control of a local microprocessor. In U.S. Pat. No. 4,974,630, a gas pressure regulator with a throttle valve is introduced in which the throttle valve has a sealing plug comprised of a needle and a base float fluidically drafted for closing a truncated cone hole of the throttle valve. U.S. Pat. No. 4,974,629 is a gas pressure regulator for saving a resetting operation, which includes a throttle valve provided between a gas inlet passage having an orifice formed therein and a pressure sensing chamber pertaining to a gas exit passage.

Scanning over the previous arts within U.S. Pat. Nos. 4,971,108, 4,966,183, 4,874,011, 4,840,195, 4,817,664, 4,811,755, 4,757,839, 4,684,080, 4,679,582, 4,606,371, 4,546,752, 4,503,883, 4,332,549, 4,111,222, 4,067,355, 4,067,354, 3,989,060, 3,971,410, 3,845,780, 3,841,303, 3,773,071, 3,698,425, 3,675,678, 3,665,956, 3,648,727, 3,623,506, and 3,580,271, it can be concluded that all pressure regulators introduced here have the similar mechanism: they use regulating pressure to adjust the pressure level by throttling pressurized gas stream in the configured chamber or passage, even though they may be used in dissimilar controlling manners (diagram, mechanical level, actuators, etc.) specialized for specific operating conditions and industrial applications.

Obviously, the prior arts have made significant improvements and progress in terms of a pressure regulator for manipulation and controllability, but none have made significant improvement on the purpose of utilizing and recovering pressure drop energy from pressure regulation processes. None of previous arts have made a contribution on the design of a pressure regulator to reduce or eliminate the spontaneous temperature effects which are undesirable and harmful to some industrial processes and systems, associated with the pressure regulating operation. Although there are several forms of pressure regulators used for pressure drop regulation processes shown in prior arts, there was hardly any type of regulator which can be used as a pressure energy recovery device during the regulating pressure drop to reheat the pressurized gas stream and to increase the stream temperature as well. Therefore, the limitations and incapacity of the previous arts have given rise to the significance of the present invention in offering a solution to the energy loss problem in the regulating process.

By contrast with the traditional pressure regulation method and devices aforementioned, the present invention, for its primary object, introduces a method and a device using the mechanism of gas wave interaction during the pressure regulation processes to recover pressure drop energy. The said method and device for pressure regulation in the present invention transfers the pressure drop energy from the regulated pressurized-gas stream into a form of heat inside the device and returns it by reheating the pressurized-gas stream after pressure regulation to compensate for the spontaneous temperature drop. The applicant's apparatus will provide a steady effective operation based on such special operating mechanism of oscillation flow. In its turn, the flow is produced by compressible gaseous waves driven by the pressure drop energy in a designed structure for such an aim to effectively recover pressure energy dispersed in pressure regulation without involvement of any mechanical moving parts. Such a method and the present invented device is especially suitable for special technical processes in energy and chemical industries where the pressure drop regulation of providing pressurized gas streams are needed but the spontaneous temperature drop is unacceptable or harmful for the systems operation. Following the aforesaid example, the original oil burner heating a natural gas stream to prevent temperature drop from pressure regulation shown in FIG. 4A, can be removed after using the present invented device as shown in FIG. 4B.

Therefore, the present invention using the gaseous wave pressure regulating method is able to provide an effective method for industrial processes to regulate the pressure operating condition and to recover the pressure drop energy loss without the negative temperature drop effect. With a view to such a purpose, the present invention aims at meeting several important objectives of its industrial application.

The first is to provide a gas wave pressure regulation method and apparatus to replace the traditional pressure regulators to meet the requirement of operating conditions of the industrial system without the undesirable temperature drop.

The second is to provide a gas wave pressure regulation method and apparatus for petrochemical industries to recover the energy in a high pressure drop from the conventional pressure regulation processes and reuse the recovered energy in the form of heat in the systems to compensate for the energy loss in the source to elevate the pressure level of the pressurized gas stream.

The third is to provide a wave pressure regulation method and apparatus for the LNG operating plant to be used in the gas supply inlet where the pressure regulation is needed to adjust the supplying pressure fit to the pressure condition of the operation plant and to avoid using additional reheating equipment.

The fourth is to provide a gas wave pressure regulation method and apparatus for a natural gas regulating station between gas supply pipeline and residential network to reuse the waste pressure drop energy during the pressure regulation process to avoid the light hydrocarbon condensation, regulator damage by icing, or rust due to the temperature drop with the pressure regulation.

The fifth is to provide a gas wave pressure regulation method and apparatus for the LNG fuel vaporized system in the LNG vehicle to recover the pressure energy from the vaporization process of LNG fuel and increase the engine efficiency by reheating the gas fuel before combustion is generated from the recovered pressure energy.

The sixth is to provide a gas wave pressure regulation method and apparatus for the fuel vaporized system of liquid gaseous fuel for rocket engines to increase the engine's efficiency by increasing the temperature of injecting gas fuel before the vaporized fuel enters the combustion chamber.

The last objective is to provide a gas wave pressure regulation method and apparatus with an energy recovery system which is able to operate under extreme high pressure drop condition by means of a multi-stage operation of the gaseous wave regulation device in a series to recover the pressure drop energy into the form of heat to be recycled.

With these and other objectives in view, as will be apparent to those skilled in the art, the present invention resides in the combination of parts set forth in the specification and is covered by the claims appended hereto.

SUMMARY OF INVENTION

In general, the apparatus in the present invention, gaseous wave pressure regulator (GWPR), being a core part of the pressure energy recovery system, comprises a flow buffer chamber which induces the pressurized gas stream, a chamber covering housing which holds the nozzle plug and pin-rod used to adjust the pressure level of regulation processes, a nozzle or nozzle set which renders a stable high speed jet or jets through depressurized gas stream being regulated, a resonant tube or bundle of resonant tubes which support the gas column oscillation with high frequency, a reheating unit in which the heat, generated and released by gas column oscillation, is absorbed after the depressurized regulation process and is returned to the depressurized gas stream, and an outlet housing chamber which stabilizes the depressurized gas stream after the reheating and pressure regulation.

The pressure energy recovery system itself, in the present invention, consists, generally, of several gaseous wave pressure regulators combined with heat exchangers in a series, by which the pressure drop energy is converted into the form of heat through each of the gaseous wave pressure regulators, and released in the form of heat in the heat exchanger following the GWPR. The maximum pressure energy recovery is achieved by controlling the pressure drop through each GWPR. In fact, each stage of said energy recovery system comprises a GWPR and a heat exchanger. The GWPR recovers the pressure drop energy in pressure regulation processes and returns it to the gas stream after pressure regulation, and the heat exchanger functions to deliver the heat energy from the depressurized gas stream to another source.

BRIEF DESCRIPTION OF THE DRAWINGS

The characteristics of the present invention, may be best understood by reference to one of its structural forms illustrated by the accompanying drawings in which.

DETAILED DESCRIPTIONS OF THE PREFERRED EMBODIMENT

Figure 1:
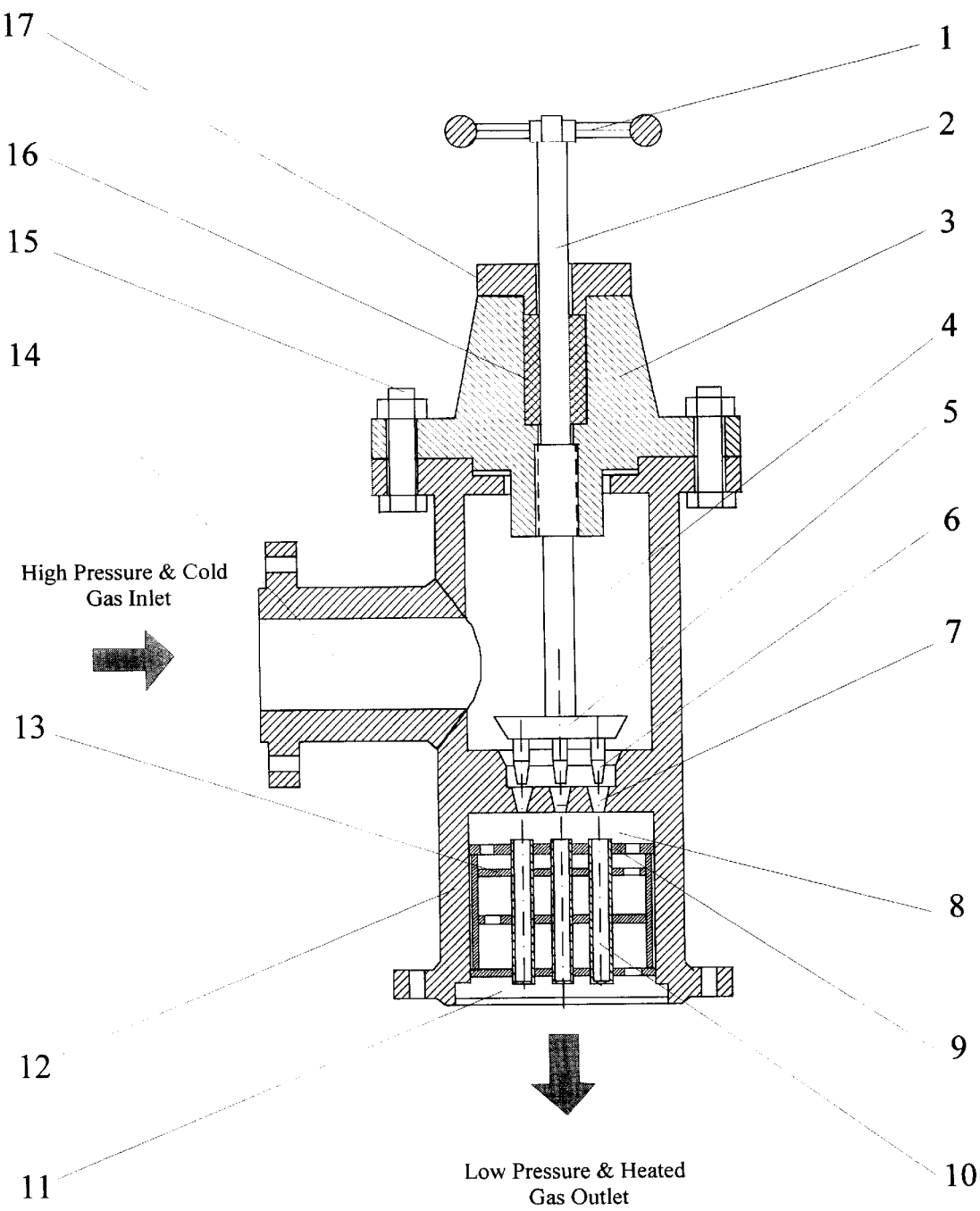
FIG. 1 is a side exploded view of the GWPR for high flow volume rate.
Figure 2:
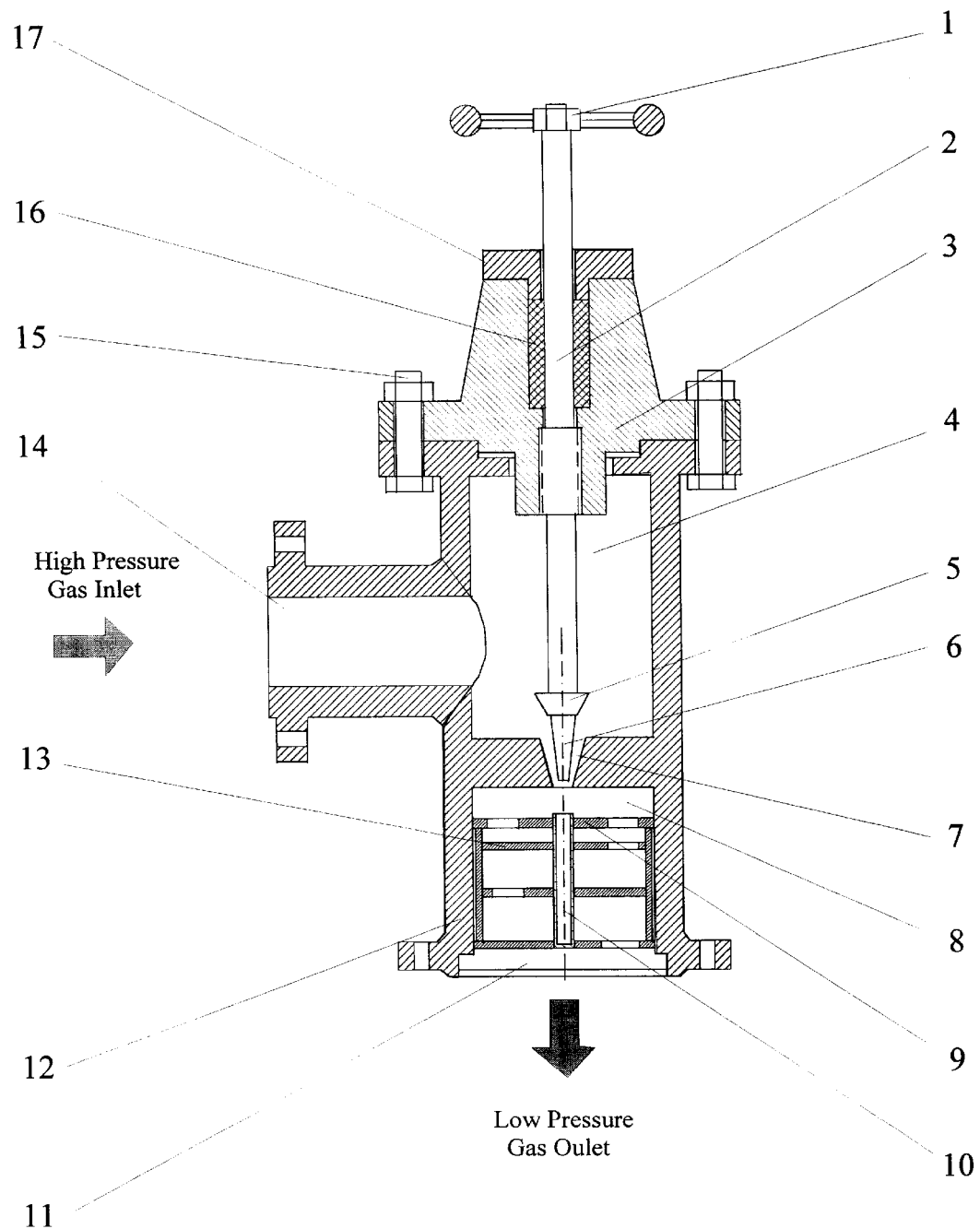
FIG. 2 is a side exploded view of the GWPR for low flow volume rate.
Figure 3:
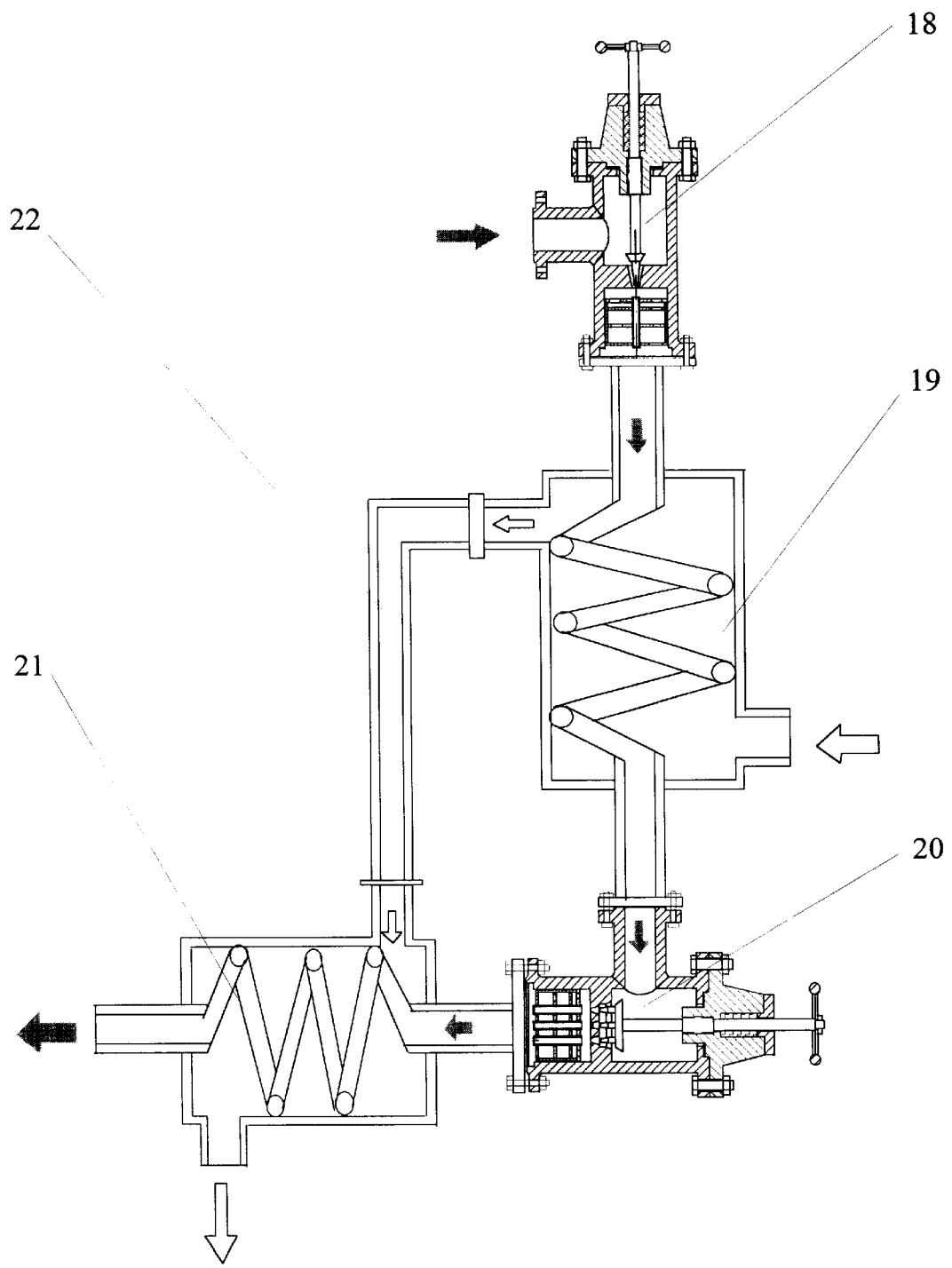
FIG. 3 is a schematic view of the pressure energy recovery system using GWPR of the present invention.

FIG. 1, FIG. 2, and FIG. 3 best describe the general features, operating mechanism and structure of a GWPR in the present invention, which primarily consists of a flow rate controlling unit of pressurized gas stream, a flow induction unit, and a pressure energy converting unit. Said flow rate controlling unit comprises a handwheel 1, a spindle 2, a covering housing 3, a nozzle plug 5, nozzle pin-rod or pin-rods 6, a nozzle or nozzles 7, fattened bolts 15, a packing gland 16, a bushing 17. Said pressure energy converting unit comprises an oscillating chamber 8, a conduit disk 9, a resonant tube 10 in GWPR 23 of FIG. 3 or a bundle of resonant tubes 10 in GWPR 25 of FIG. 3, an outlet chamber 11, a body housing 12, a reheating unit 13, flow control plates 14. Said flow induction unit comprises an inlet conduit 14, a buffer chamber 4.

FIG. 3 best shows the corresponding pressure energy recovery system resulted from the GWPR in the present invention which comprises a primary GWPR 18 with a lower volume rate for high pressure level, a primary heat exchanger 19 connected to said primary high pressure GWPR 18, a secondary GWPR 20 for high volume flow rate at the lower operating pressure level which is connected to primary heat exchanger 19, and a secondary heat exchanger 21 which is connected to the outlet of said secondary low pressure GWPR 20.

Referring to FIG. 1 and FIG. 2, the outlines of the GWPR 18 and 20 are indicated, in which the body housing 12 is covered by the covering housing 3 with a nozzle adjusting mechanism consisting of the handwheel 1, the spindle 2 with the partial section of a thread, associated with the sealing parts of GWPR comprising the packing gland 16, and the busing 17, which functions to seal the cylindrical surface around the spindle 2 in order to prevent the leak of pressurized gas stream inside the buffer chamber 4 from the GWPR operating environments. The said buffer chamber 4 connected to the said inlet conduit 14 from the direction of side wall which forms a stream passage leading the pressurized gas stream into said buffer chamber 4. The said nozzle 7 separates said buffer chamber 4 which is at the primary high pressure level from low pressure level reached by the pressure regulating operation. Following the said nozzle 7, a pressure energy converting unit in which the pressure drop energy is recovered during the regulating process, comprises the said oscillating chamber 8 where the jet rushed out of said nozzle 7 undergoes a underexpansion process and forms a normal shock wave system inside the jet, the reheating unit 13 which includes the conduit disk 9, the resonant tube 10 in GWPR 18 or the plurality of resonant tubes 10 in GWPR 20, combined with several flow control plates which are connected together before the outlet chamber 11. In essence, when a pressurized gas stream enters into the GWPR 18 or 20 undergoing a pressure regulating process, it at first flows through the inlet conduit 14 where the stream is led to the buffer chamber 4. After entering the buffer chamber 4, the pressurized gas stream drops its velocity, associated with the increment of static pressure, and reduces the turbulence and vortice in the pressurized gas stream by means of a flowing diffusion process. As the pressurized gas stream flows through the convergent nozzle 7, the portion of pressure energy carried in the stream is converted into the kinetic energy, and the stream velocity gradually increases. With the pressurized gas stream rushing out of the outlet of nozzle 7, a high speed free jet in GWPR 18 and high speed free jets in GWPR 20 are formed in the front of the oscillating chamber 8. At the down stream of oscillation chamber 8, the resonant tube 10 in GWPR 18 and the bundle of resonant tubes 10 in GWPR 20 are mounted in alignment with the nozzle 7 in GWPR 18 and the nozzles 7 in GWPR 20 coaxially with the space between the nozzle exit and the inlet of resonant tube.

As a matter of principle of gasdynamics, when the pressurized gas stream flows through the nozzle 7 in GWPR 18 or 20, it undergoes an initial process of pressure regulation or reduction by throttling effects, where the total pressure of the pressurized gas stream is reduced within a small quantity range due to the wall friction and the increment stream entropy in the nozzle 7. The velocity of pressurized gas stream reaches the maximum value in the throat section of said nozzle 7 (which equals sound speed), which is located in the exit if a convergent nozzle is used. As the jet passes the throat section where either is inside the nozzle 7 for the nozzle with a convergent-divergent passage or at the exit of the nozzle for the convergent nozzle, it experiences the second stage of pressure regulation or reduction caused by the underexpanding jet passing the shock wave systems. During this stage, as contrasted to the process that the gas stream passes the conventional pressure regulator, the energy of pressurized gas stream is partially dissipated by the strong jet shock wave systems so that it will result in the high entropy generation in the gas stream. The rest of the pressure energy is retained in the form of kinetic energy which is carried with the jet flowing. After the underexpanding jet enters the oscillation chamber 8, the significant portion of energy carried in the high speed jet or jets is released in the GWPR of the present invention. In contrast with the GWPR in the present invention, this portion of energy in the pressure regulators reported in the previous arts can not be dissipated, and the pressure level will be partially elevated as the depressurized gas stream goes through the enlargement section-passage in the downstream chamber. It is very clear that the generation of pressure reduction in conventional pressure regulation devices is due to the energy dissipating processes at the initial throttling stage. Hence in the conventional pressure regulator, the pressure regulation must be achieved inside the designed narrow flow passage which provides a high friction and throttling process to compensate for the pressure recovery effect in the downstream of regulators. Such a process in the conventional pressure regulator usually causes a temperature drop and pressure energy waste in the pressurized gas stream.

In the present invention, the portion of kinetic energy which is not dissipated in the conventional pressure regulator employed in the previous arts, can be effectively dissipated in succession by periodic wave systems to generate the significant heat effect when the underexpanding jets interact with the resonant tube 10. The major portion of pressure energy can be recovered by reheating the depressurized gas stream at the downstream to compensate for the temperature reduction which sometimes is spontaneously unacceptable in the LNG and other industrial systems. Hereby, this operating mechanism of gaseous wave pressure regulation and the art of design used in the present invention fundamentally differ from the traditional means used in the previous arts, and form the basis of the features of the present invention.

For more details of the GWPR operation, again referring to FIG. 1 and FIG. 2, after flowing through the nozzle 7, the underexpanded high speed jets are impinged on the open end of resonant tube 10 in GWPR 18 and open ends of the bundle of resonant tubes 10 in GWPR 20 if the resonant tube or bundle of resonant tubes 10 is or are placed in the core region of underexpanded jets with the distance away from the exit of the nozzle 7. During the impinging process between the underexpanded jet and gaseous column inside the said resonant tube 10, the normal shock wave will be formed in the front of opening end of resonant tubes 10. This normal shock wave appearing in the high speed jets of depressurized gas stream is interfered with the gas column inside resonant tube or tubes 10. The interaction between the jet and gas column during the impingement will generate strong pressure disturbances which propagate in both directions along the jet: the upstream direction of the underexpanded jet and the downstream direction of gas column inside resonant tube 10. The pressure disturbances propagated on the upstream of jet will change the pressure condition simultaneously before and after the normal shock wave, and result in the variation of shock wave position to respond to the pressure fluctuation caused by the pressure disturbances. As a consequence, the normal shock wave formed in the impinging jet with the resonant tube will become unstable and move between the open end of resonant tube 10 and the exit of said nozzle 7 inside the oscillating chamber 8. On the other hand, the pressure disturbances propagated downstream into the resonant tube 10 will induce the gas column oscillation at the inherent resonant frequency of the resonant tube 10. Once the induced motion of the normal shock wave couples with the gas column oscillation mutually, the self-sustained oscillation of the gas column inside resonant tube 10 will be excited, accompanied with the significant heating effect generated by the periodic compression of pressure wave moving and viscous friction of the wall inside the resonant tube 10. The kinetic energy carried by the jet after the throttling process is converted into the form of heat and released from the wall surface of the resonant tube 10. Furthermore, this portion of heat energy can be recovered by leading the depressurized gas through the outside surface of resonant tube 10 after exchanging the kinetic energy with resonant tube 10. Actually, the depressurized gas stream after releasing its kinetic energy to the resonant tube 10 in the oscillation chamber 8, at first, will pass the conduit disk 9 in order to stabilize the stream and reduce the flowing interference to the impinging processes between the jet flow and resonant tubes 10. After passing conduit disk 9, the depressurized gas stream is conducted through several flow controlling plates inside the reheating unit 13 by which the gas stream is conducted to flow over the surface of resonant tube or bundle of resonant tubes 10 in a serpentine manner. The heat exchange between the depressurized gas stream and the surface of bundle of resonant tubes 10 reheats the depressurized gas stream before it leaves the GWPR. After reheated, the depressurized gas stream enters the outlet chamber 11 to finish the pressure regulating process.

Again referring to FIG. 3, the pressure energy recovery system using the GWPR device as the core parts, is well illustrated, which comprises a primary GWPR 18 provided for the operation in low volume flow rate at a high pressure level, a primary high pressure heat exchanger 19, a secondary GWPR 20 provided for high volume flow rate, and a secondary low pressure heat exchanger 21. In the regulating process with a high pressure drop ($\Delta p > 300$ psi) which is the most common condition operated in conventional pressure regulators, noticeable pressure energy is wasted by the dissipation of the throttling process. The pressure energy recovery system in the present invention is designed to recover the pressure energy during high pressure regulating processes in industrial processes. The basic operation is described as follows: the highly pressurized gas stream in the high pressure level, firstly, enters the primary GWPR 18 which is designed to handle a small flow rate at the high pressure level. After flowing through GWPR 18, the pressurized gas stream reduces the pressure by the expansion process which results in a volume increase. Then, the gas stream enters the primary heat exchanger 19 in which the heat absorbed from the pressure drop in the primary GWPR 18 is released to the recirculating coolant fluid passing through the shell of the heat exchanger 19. To fit the requirement of operating conditions with a small volume rate in the high pressure level, the GWPR 18 is designed with a single nozzle 7 and resonant tube 10. Out of the primary heat exchanger 19, the gas stream experiences the secondary pressure regulation in a secondary GWPR 20 which is designed to handle the volume rate increase after the primary pressure regulation. Inside the GWPR 20, the pressure of the gas stream is reduced further, and similarly the heat converted from the pressure drop energy is released inside the secondary heat exchanger 21. In the secondary heat exchanger 21, the recirculating fluid is reheated again, and the output can be reused in systems. In the present system, the pressure drop distribution between the two stages of the GWPR operation is very critical to make the energy recovery efficient, which needs to be selected carefully before the nozzle and resonant geometrical parameters is determined in designing.

Summarily stated, the GWPR will be operated under a pulsating flow production created by the interaction between the resonant tube and underexpanded jet, in which the self-sustained longitudinal oscillation of normal shock wave in the high speed jet due to the impinging interaction is coupling with the oscillation of gas column in the resonant tubes. The pressure energy wasted in conventional pressure regulators can be recovered in the form of heat created by a resonant wave system in the present invention GWPR. By reheating the pressurized gas stream itself after pressure regulation, the present invention can overcome the drawback of unexpected temperature drop during the pressure regulation. From the GWPR experiments, it is shown that the pressurized gas stream can be reheated more efficiently if the internal energy loss is reduced during the longitudinal oscillation of the gas column driven by jets. The geometrical parameters of nozzle, diameter of resonant tubes, the length of resonant tubes, and cross-section shape of resonant tube are very critical to influence the GWPR operations. The efficiency of pressure energy recovery is effected by operating conditions with those parameters which will result in that the GWPR operates in different oscillating modes. Owing that pressure energy is a high grade energy as the driving force in the GWPR operation, the effective operation of GWPR will be reached in the case that a heating pump cycle can be driven by a resonant pressure wave system originated from the self-sustained oscillation between the jet and gas column. Hence, the pressure energy converted from high speed jet will not be directly dissipated by gas column oscillation and wall friction. The heat generated by resonant tube will be accumulated on the surface of the tube. The internal energy loss of high speed jet to drive the gas column oscillation will be compensated by the heat effect generated by the resonant tube and entropy increment in the jet underexpansion.

The invention having been thus described, what is claimed as new and desired to secure by Letter Patent is:

1. A gaseous wave pressure regulation method comprising
   (a) a process generating a gaseous wave system through a flow controllable means within a pressure regulation process, wherein said process of generation of gaseous wave interaction is produced by the interaction between a high speed jet driven by a pressure drop of a pressurized gas stream being regulated through a controllable convergent or convergent-divergent flowing passage during pressure regulation processes and a gaseous column in a resonant tube, wherein said gas column is driven in oscillating by a shock wave disk in said high speed jet and pressure-waves feedback from said oscillating gas column, coupled with the oscillation of said shock wave disk in said high speed jet generated by said pressurized gas stream being regulated, and generates an intensive energy-dissipation process by said gaseous waves interaction within said resonant tube and an intensive heating effect on the surface of said resonant tube sustained by said high speed jet generated from said pressurized gas stream being regulated, and
   (b) a process recovering the energy from said pressurized gas stream being regulated after being depressurized by passing through said surface of said resonant tube containing said oscillating gas column in the form of heat, wherein said pressurized gas stream being regulated is regulated after passing through said flow controllable convergent or convergent-divergent flowing passage and an oscillating chamber to dissipate the energy of said pressurized gas stream being regulated, release the pressure drop energy while being regulated, then recover said released energy from said surface of said resonant tube in the form of heat to compensate for its temperature drop during regulation.

2. A pressure energy recovery system, comprising a primary gaseous wave pressure regulation apparatus to handle a small volume flow rate in higher pressure level as the primary stage of the said system, a primary heat exchange unit connected to the outlet of said primary gaseous wave pressure regulation apparatus, a secondary gaseous wave pressure regulation apparatus to handle high volume flow rate at a lower pressure level linked to the outlet of said primary heat exchange unit, a secondary heat exchange unit connected to the said secondary gaseous wave pressure regulation apparatus, and a conduit connected between said primary heat exchange unit and said secondary heat exchange unit.

3. The pressure energy recovery system as recited in claim 2, wherein said primary gaseous wave pressure regulation apparatus contains a single resonant tube and nozzle within the said flow rate controlling unit and said pressure energy converting unit, and said secondary gaseous wave pressure regulation apparatus contains the plurality of said resonant tubes and plurality of said nozzles in the said flow rate controlling unit and pressure energy converting unit.

4. A gaseous wave pressure regulation apparatus comprising a flow induction unit, a flow rate controlling unit, and a pressure energy converting unit, and wherein the said induction unit consists of an inlet conduit and a buffer chamber connecting to said inlet conduit, which leads said pressurized gas stream being regulated to said flow rate controlling unit, wherein the said flow rate controlling unit comprises a regulator housing containing said buffer chamber, a nozzle held by said regulator housing, a covering housing covered to said regulator housing, a spindle caged and conducted by said covering housing, which converts said pressurized gas stream being regulated into a high speed jet injected into said pressure energy converting unit, and wherein the said pressure energy converting unit consists of a resonant tube with an open end aligned with the exit of said nozzle and a closed-end at the other end, an oscillating chamber between said nozzle and said resonant tube, a reheating unit supporting and holding said resonant tube with several flow conducting plates, and an outlet chamber connected after said reheating unit.

5. The gaseous wave pressure regulation apparatus as recited in claim 4, wherein said nozzle with a special shape provides the maximum kinetic energy conversion of said pressurized gas stream being regulated, and wherein said resonant tube with the special geometric shapes at its cross-section along the axial direction of the tube (in a uniform and non-uniform cross section with the length variation) provides the maximum pressure energy dissipation and reheating effect on said resonant tube surface.

6. The gaseous wave pressure regulation apparatus as recited in claim 4, further comprising
   (a) a handwheel fastened at the one end of said spindle, a threading section in the middle of said spindle, a nozzle plug fastened to the other end of said spindle in said flow controlling unit,
   (b) a nozzle pin-rod fastened to said nozzle plug in said flow controlling unit,
   (c) a set of packing glands with an annular shape filled into said covering housing and penetrated by said spindle, a bushing screwed to said covering housing in tightly pressing said packing gland set in said flow controlling unit, (d) said reheating unit comprising several flow control plates supporting said resonant tube and a flow conducting disk mounted close to the open end of said resonant tube in said pressure energy converting unit.

7. The gaseous wave pressure regulation apparatus as recited in claim 6, wherein said nozzle plug with a special conicity on the side wall provides the flow rate controllability and the closing function of said gaseous wave pressure regulation apparatus, wherein said nozzle pin-rod with a special conicity shape provides the pressure drop adjustment in the formation of high speed jet of said gaseous wave pressure regulation apparatus, wherein said flow control plates contain the elongated through holes to lead said pressurized gas stream flowing after being regulated through said surface of said resonant tube in a serpentine way, wherein said flow conducting disk contains several elongated through holes with uniform distribution along the peripheral direction to provide the leading passage for said pressurized gas stream flowing after being regulated.

8. A gaseous wave pressure regulation apparatus as recited in claim 4, comprising a flow induction unit, a flow rate controlling unit, and a pressure energy converting unit, wherein the said flow rate controlling unit comprises a regulator housing containing said buffer chamber, plurality of nozzles held by said regulator housing, a covering housing covered to said regulator housing, a spindle caged and conducted by said covering housing, which converts said pressurized gas stream being regulated into plurality of high speed jets injected into said pressure energy converting unit, and wherein the said pressure energy converting unit consists of plurality of resonant tubes, an oscillating chamber between said plurality of nozzles and said plurality of resonant tubes, a reheating unit supporting and holding said plurality of resonant tubes with several flow conducting plates, and an outlet chamber connected after said reheating unit.

9. The gaseous wave pressure regulation apparatus as recited in claim 8, wherein said plurality of nozzles with special shapes provide the maximum kinetic energy conversion of said pressurized gas stream being regulated, and wherein said plurality of resonant tubes with the special geometric shapes at their cross-sections (in a uniform and non-uniform cross section with the length variation) provide the maximum pressure energy dissipation and reheating effect on said plurality of resonant tube surfaces.

10. The gaseous wave pressure regulation apparatus as recited in claim 8, wherein said plurality of resonant tubes has the same number as said plurality of nozzles, and wherein each of said plurality of resonant tubes has an open end aligned exclusively with one exit of said plurality nozzles.

11. The gaseous wave pressure regulation apparatus as recited in claim 8, further comprising (a) a handwheel fastened at the one end of said spindle, a threading section in the middle of said spindle, plurality of nozzle plugs fastened to the other end of said spindle in said flow controlling unit, (b) plurality of nozzle pin-rods fastened to said plurality of nozzle plugs in said flow controlling unit, (c) a set of packing glands with an annular shape filled into said covering housing and penetrated by said spindle, a bushing screwed to said covering housing in tightly pressing said packing gland set in said flow controlling unit, (d) said reheating unit comprising several flow control plates supporting said plurality of resonant tubes and a flow conducting disk mounted close to the open end of said plurality of resonant tubes in said pressure energy converting unit.

12. The gaseous wave pressure regulation apparatus as recited in claim 11, wherein said plurality of nozzle plugs with a special conicity on the side wall provides the flow rate controllability and shut-off function of said gaseous wave pressure regulation apparatus, wherein said plurality of nozzle pin-rods with a special conicity shape provides the pressure drop adjustment in the formation of plurality of high speed jets of said gaseous wave pressure regulation apparatus, wherein said flow control plates contain the elongated through holes to lead said pressurized gas stream flowing after being regulated through said surface of said plurality of resonant tubes in a serpentine way, wherein said flow conducting disk contains several elongated through holes with uniform distribution along the peripheral direction to provide the leading passage for said pressurized gas stream flowing after being regulated.

* * * * *

UNITED STATES PATENT AND TRADEMARK OFFICE
CERTIFICATE OF CORRECTION

PATENT NO. : 6,152,158
DATED : November 28, 2000
INVENTOR(S) : Zhimin Hu

Figure 4A:
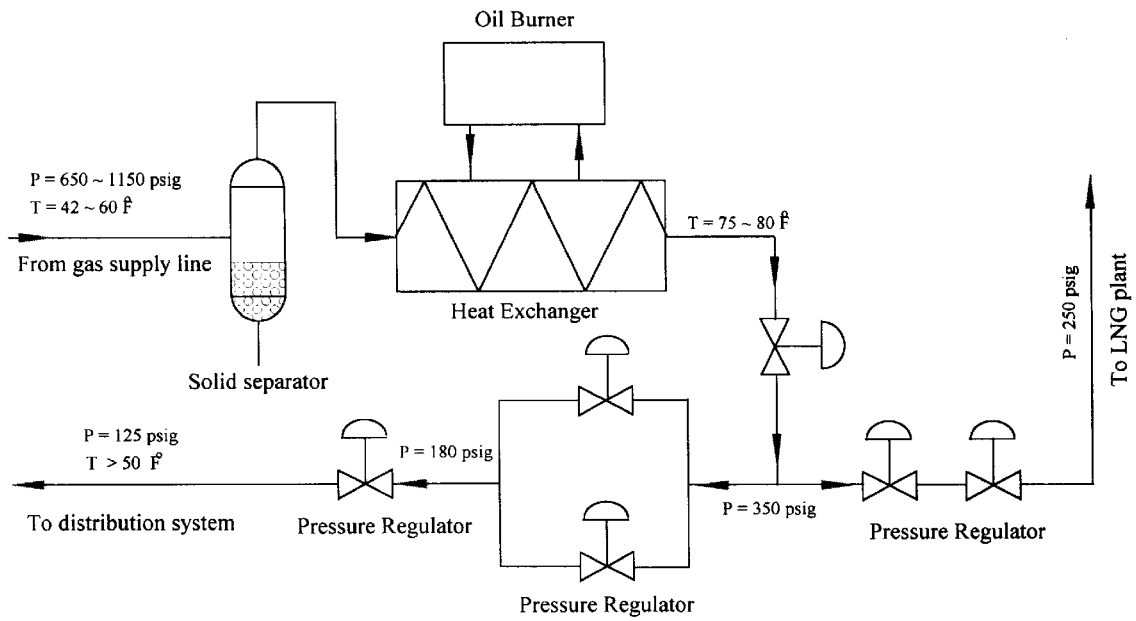
FIG. 4A is a flow chart of an example of a pressure regulating system in the LNG industry before using GWPR.
Figure 4B:
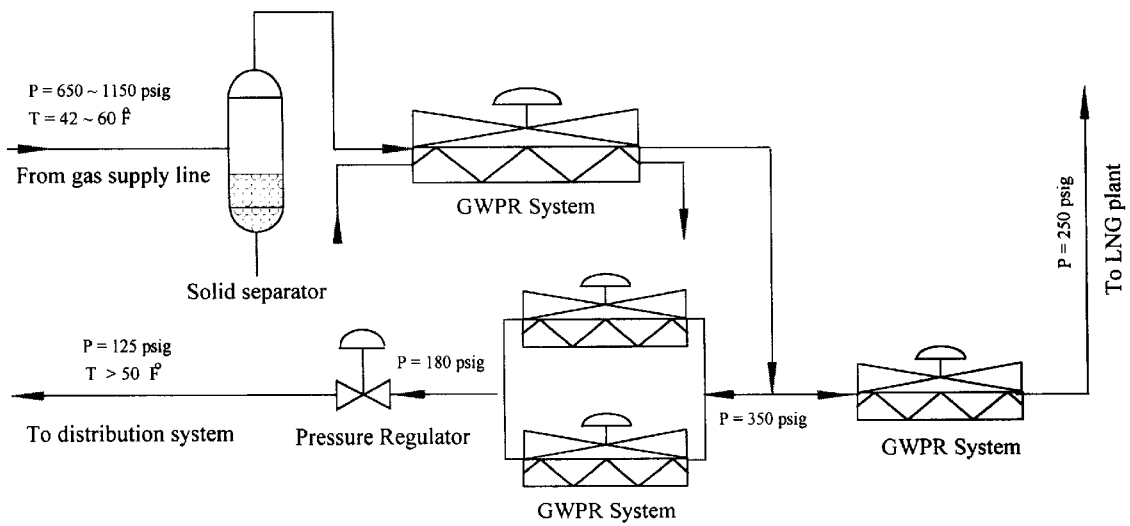
FIG. 4B is an improved flow chart of, a recited example of pressure regulating system in the LNG industry after using GWPR.

It is certified that error appears in the above-identified patent and that said Letters Patent is hereby corrected as shown below:

Title page,
Change "the drawing shown in the title page which was numbered as (Figure-4B) in the finally filed application, to" -- the drawing which was numbered as (FIG.1) in the finally filed application. --

Signed and Sealed this

Twenty-fifth Day of September, 2001

Attest:

*Nicholas P. Godici*

NICHOLAS P. GODICI
*Attesting Officer*        *Acting Director of the United States Patent and Trademark Office*